(12) United States Patent  
Ogasawara

(10) Patent No.: US 6,327,576 B1
(45) Date of Patent: Dec. 4, 2001

(54) SYSTEM AND METHOD FOR MANAGING EXPIRATION-DATED PRODUCTS UTILIZING AN ELECTRONIC RECEIPT

(75) Inventor: Nobuo Ogasawara, Atsugi (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 09/400,124

(22) Filed: Sep. 21, 1999

(51) Int. Cl.[7] .................................................. G60G 1/14
(52) U.S. Cl. ............................................................ 705/22
(58) Field of Search .......................................... 705/2, 22

(56) References Cited

U.S. PATENT DOCUMENTS

| | | | |
|---|---|---|---|
| 4,866,661 | 9/1989 | de Prins | 364/900 |
| 4,973,828 | 11/1990 | Naruse et al. | 235/380 |
| 5,448,044 | 9/1995 | Price et al. | 235/380 |
| 5,469,363 | 11/1995 | Saliga | 364/478 |
| 5,590,038 | 12/1996 | Pitroda | 395/241 |
| 5,739,512 | 4/1998 | Tognazzini | 235/380 |
| 5,821,513 | 10/1998 | O'Hagan et al. | 235/383 |
| 5,845,256 | 12/1998 | Pescitelli et al. | 705/4 |
| 5,953,234 | * 9/1999 | Singer et al. | 364/478.02 |
| 6,003,006 | * 12/1999 | Colella et al. | 705/2 |

FOREIGN PATENT DOCUMENTS 0 942 383 A1    9/1999    (EP).

OTHER PUBLICATIONS

Electronic Times, "Clever Containers", Sep. 6, 1999, p31.*

* cited by examiner

Primary Examiner—Kenneth R. Rice
(74) Attorney, Agent, or Firm—Christie, Parker & Hale, LLP

(57) ABSTRACT

The present invention provides apparatus, systems and methods by which information concerning the shelf-life limitations of a particular product item is made available to the purchaser electronically; that the electronically recorded shelf-life limitation information is provided to, or made accessible by, the purchaser; that the electronically recorded shelf-life limitation information is communicated to a computer equipped with a microprocessor, or to a computer system network, accessible by the purchaser, programmed to receive the shelf-life limitation data for each product for that purchaser; that the computer or purchaser-accessible computer system network, is further programmed to provide the purchaser with on-screen and/or printed reports of various formats that list the items purchased and the corresponding shelf-life limitation information; and that the computer or purchaser-accessible computer system network provides interactivity with the purchaser to allow the purchaser to identify further information to the computer/network, such as identifying location information of each particular product item, and the inventory status of each particular product item, e.g., whether the product has been opened or has been discarded.

10 Claims, 6 Drawing Sheets

FIG. 4

| Customer Name | Mike Smith | | | | |
|---|---|---|---|---|---|
| Customer ID | 123456 | | | | |
| Store Name | ABC Store, N.Y. | | | | |
| Shopping Date and Time | 01/01/98  11:30 | | | | |
| Item Description | Quantity | Price | UPC | Expiration Date | Freshness Period After Package Opened |
| Fuji Apples | 6 | 6.98 | 41001111 | 01/15/98 | |
| One gallon 2% low fat milk | 2 | 7.48 | 41112222 | 01/07/98 | |
| Country beef sausage | 1 | 4.98 | 41223333 | 06/30/98 | 7 days |
| Low fat cream cheese | 2 | 5.96 | 41334444 | 09/30/98 | 10 days |
| 2-ply tissues | 6 | 3.66 | 41445555 | | |
| Disney shampoo | 1 | 3.48 | 41556666 | ------ | ------ |
| ------ | ------ | ------ | | | |
| TOTAL | | 58.66 | | | |

FIG. 3

| UPC | Expiration Date | Freshness Period After Package Opened |
|---|---|---|
| 41001111 | 01/15/98 | |
| 41112222 | 01/07/98 | |
| 41223333 | 06/30/98 | 7 days |
| 41334444 | 09/30/98 | 10 days |
| 41445555 | | |
| 41556666 | ------ | ------ |

Today's Date: 01/02/99

| Item Description | Quantity | Purchase Date | Best by | Use within |
|---|---|---|---|---|
| Eggs | 12 | 12/26/98 | 01/05/98 | |
| Strawberry Yogurt | 2 | 12/26/98 | 01/05/98 | 5 days |
| Grapefruit | 6 | 12/30/98 | 01/12/98 | |
| Lettuce | 1 | 12/30/98 | 01/05/99 | |
| Fuji Apples | 6 | 01/01/99 | 01/15/99 | |
| One gallon 2% low fat milk | 2 | 01/01/99 | 01/07/99 | |
| Country beef sausage | 1 | 01/01/99 | 06/30/99 | 7 days |
| Low fat cream cheese | 2 | 01/01/99 | 09/30/98 | 10 days |
| Near Expired Items | | | | |
| Spinach | 2 | 12/30/98 | 01/03/99 | |
| Mushrooms | 1 | 12/20/98 | 01/04/99 | |
| Expired Items | | | | |
| Turkey Ham | 1 | 11/25/98 | 12/25/98 | |

SYSTEM AND METHOD FOR MANAGING EXPIRATION-DATED PRODUCTS UTILIZING AN ELECTRONIC RECEIPT

FIELD OF THE INVENTION

The present invention relates generally to inventory control systems and methods and more particularly to apparatus, systems and methods for managing expiration-dated products.

BACKGROUND OF THE INVENTION

Many products and materials have a limited "shelf-life." That is, many products, ranging from pharmaceuticals to food products to batteries, are "fresh" for only a certain amount of time. In the case of pharmaceuticals, a particular compound may begin to lose its efficacy a certain amount of time after the compound is manufactured. In the case of unopened packaged food products, even the best packaging may allow deterioration of the freshness and/or quality of many food products a certain amount of time after the product is prepared and packaged. Even photographic film can only be trusted to preserve those precious moments for a certain amount of time after the film is manufactured and packaged. Once opened, many packaged products, such as food, deteriorate in freshness and/or quality within an abbreviated period of time.

Many products are labeled with an expiration date in a form readable by the purchaser. Some products are labeled with a "freshness period" that applies to the product once the packaging is opened (e.g., use within 48 hours of opening).

Typically, the purchaser of such limited shelf-life products must manually control the inventory of such products. Manual control is especially typical of residential and personal use products such as food, prescription medicines, photographic film and the like.

Typically, the approach used to expiration-date an item would be to calculate the expiration date based on the date on which the product is being manufactured; stamp the label of the product with the appropriate expiration date; apply the label to all product items of the specified type that are manufactured on that day. Since many of the containers used to store expiration dated products are manufactured well in advance of being filled with a perishable item, it is not presently feasible to expect an item's bar code to express expiration date information. Consequently, the expiration date information applied to each item is printed or stamped on the item's packaging only when the products are ready to ship. For example, milk and yogurt are packaged in containers pre-printed with their appropriate UPC bar code. The expiration date information (i.e., good until xx/xx/xx) is stamped onto the label after the container is filled.

Because expiration date information is meant to be visually apparent to an ultimate consumer, such information is not expressed in electronic form (i.e., in bar code or RFID form). There is no efficient method by which expiration periods can be electronically acquired from an item's packaging and stored for processing and expiration date management by an ultimate consumer. Consumers must manually record freshness periods and engage in complex and time consuming inventory control activities in order to manage their food inventory. The problem becomes even more complex once it is realized that large classes of perishable goods, i.e., fresh fruits and vegetables, are not identified with any form of expiration date information.

Thus, there is a need for a system and method for acquiring expiration date and/or "freshness" information with respect to all classes of perishable goods and for simply and efficiently transferring this information to a consumer so that the consumer may maintain a perishable inventory control system with a minimum of effort, preferably without requiring any human intervention. The system and method should reflect not only an item's expiration date, but also the "freshness period remaining" after the package is open, as well as provide an alert when an item is approaching its expiration date.

SUMMARY OF THE INVENTION

These and other objects are accomplished in accordance with the present invention by providing the purchaser with electronic inventory control systems and methods for managing limited-shelf-life products.

More specifically, the present invention provides apparatus, systems and methods by which information concerning the shelf-life limitations of a particular product item is made available to the purchaser electronically; that the electronically recorded shelf-life limitation information is provided to, or made accessible by, the purchaser; that the electronically recorded shelf-life limitation information is communicated to a computer equipped with a microprocessor, or to a computer system network, accessible by the purchaser, programmed to receive the shelf-life limitation data for each product for that purchaser; that the computer or purchaser-accessible computer system network, is further programmed to provide the purchaser with on-screen and/or printed reports of various formats that list the items purchased and the corresponding shelf-life limitation information; and that the computer or purchaser-accessible computer system network provides interactivity with the purchaser to allow the purchaser to identify further information to the computer/network, such as identifying location information of each particular product item, and the inventory status of each particular product item, e.g., whether the product has been opened or has been discarded.

BRIEF DESCRIPTION OF THE DRAWINGS

These and other features, aspects and advantages of the present invention will be more fully understood when considered with respect to the following detailed description, appended claims and accompanying drawings wherein:

FIG. 3 is a simplified, semi-schematic block diagram of an exemplary expiration date database including item description information, an item identification code (UPC code) and expiration date information;

FIG. 4 is a simplified, semi-schematic layout diagram detailing an exemplary organization of an electronic receipt;

FIG. 6 is a simplified, semi-schematic layout diagram detailing the organization of an exemplary expiration date listing.

DETAILED DESCRIPTION OF THE INVENTION

In accordance with the present invention, expiration dating information pertaining to large classes of perishable goods, such as grocery items, is acquired for each of the items stocked by a particular store and maintained in such a manner as to make this information available to a consumer in the form of an electronic receipt. Once the information on an electronic receipt has been transferred to the consumer, this information is used to generate and maintain a residential inventory control system on a home terminal, for example. Thus, shelf life limitations of particular perishable items are provided to a consumer in a form transported to and processed by home electronic equipment.

There are several different types of shelf life limitation information that are associated with certain individual perishable products. Particularly, such information pertains to the shelf life of the item, i.e., the expiration date for the unopened product, and the freshness period for which the product remains viable once it has been opened. In accordance with the present invention, shelf life limitations (expiration date information) for any particular product item is acquired and recorded in such a way that it is made electronically available to the purchaser of the item, such that the expiration date information is directly associated with a particular product item.

Figure 1:
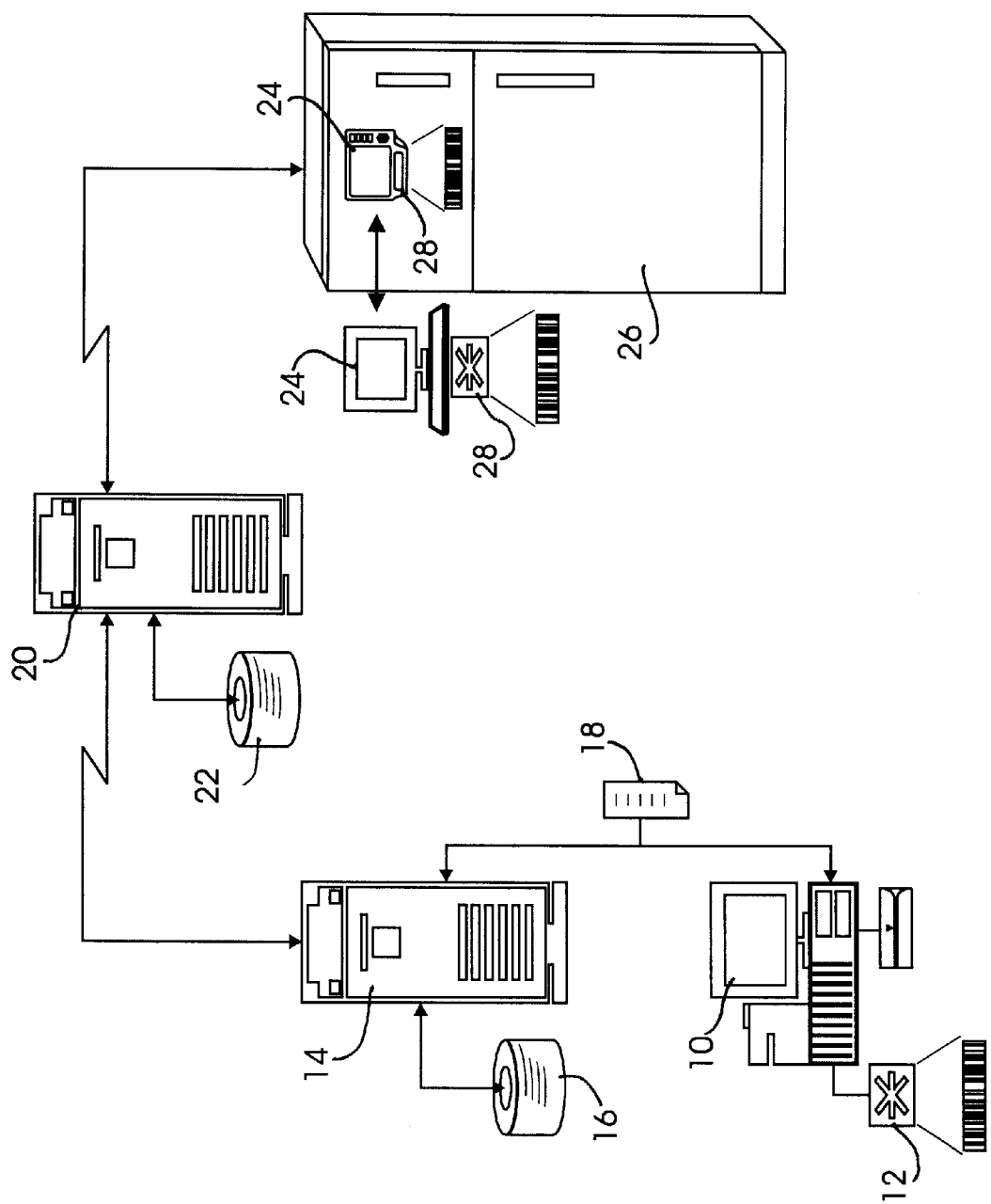
FIG. 1 is a simplified, semi-schematic diagram of an expiration date management system in accordance with the present invention, utilizing bar code information.

FIG. 1 depicts a simplified, semi-schematic diagram of an exemplary expiration date management system in accordance with the present invention, in which expiration date information is acquired, transferred and processed for any particular perishable item, in connection with a corresponding bar code item identifier. As depicted in FIG. 1, a consumer selects items to be purchased, in conventional fashion, and loads the items into a utility shopping basket. Once the consumer completes the shopping trip, the consumer takes the shopping basket to a checkout station where items are identified at a point-of-sale terminal 10 by scanning the selected items with a bar code scanner 12. In conventional fashion, the bar code scanner 12 picks up an item's UPC (Universal Product Code) or SKU (stock keeping unit) code from a bar code printed on each item's product label when the label is manufactured, or printed and attached locally in the store.

Suitable bar code information is electronically processed by the point-of-sale terminal 10 in order to identify the item description (item name) and item price. In addition, and in accordance with the practice of the present invention, the bar code information scanned from each particular item is transmitted to a store platform computer 14 which might be configured as a network server, or some other form of platform data processing unit. Once an item has been identified to the store server 14, the server system consults a database 16 which contains all of the requisite information pertaining to any item of merchandise sold by the store, including expiration date information, associated to individual merchandise items through that item's PLU or SKU code read by the bar code scanner 12.

In a manner to be described in greater detail below, the server system fetches the requisite information relating to each item scanned for purchase, and redirects that information to the POS terminal 10 where it is appended to an electronic transaction log file, termed herein an electronic receipt 18. It should be noted that the electronic receipt 18 is generated in addition to a conventional paper receipt of the form normally provided to a customer at time of check out. The electronic receipt 18 might be the primary and only receipt generated with regard to that particular transaction, i.e., the paper receipt might be provided optionally or not at all, at the option of a retail facility. Since the electronic receipt 18 is in electronic file form, the receipt might be given to the customer directly as the customer completes his transaction of the POS terminal 10, or alternatively, the electronic receipt 18 might be electronically transferred to a web server 20 belonging to the retail facility, where it is maintained in an electronic file storage area 22 for eventual retrieval by the consumer.

A direct transfer of the electronic receipt 18 to a consumer might be accomplished by issuing the consumer with a purpose-designed IC card which would necessarily include sufficient memory storage space into which an electronic receipt might be written. Various forms of IC cards are contemplated for use with the present invention. Examples of such IC cards include a common rigid plastic card that incorporates a high-density magnetic stripe, suitable for reading and writing electronic information, a wireless RF-type card which includes a semiconductor memory, or a contact-type IC card. All of these forms of IC cards are well understood by those having skill in the art and the appropriate types of equipment required to read from and write to such IC cards are readily available and, indeed, in common use in various types of retail facilities. Writing an electronic receipt to a customer's IC card offers the customer a simple and efficient method of receiving an electronic receipt from a grocery store, for example, and for transporting the electronic receipt to a remote location, such as the home, for read out, evaluation and further processing.

Hosting the electronic receipt in a file or memory storage area 22 of a retail facility's web server 20 allows the customer the freedom of being able to shop in multiple stores without the necessity of carrying multiple types of IC card, one card for each different store. As electronic receipts are loaded into the file or memory storage area 22 of each store's web server 20, the electronic receipts are available for a customer to access and download, once the customer reaches home and accesses each store's server 20 through the customer's Internet connection 20. By signing on to the Internet, and visiting each store's web site in sequence, the customer is able to download each electronic receipt maintained by each of the stores that customer has visited during the latest shopping trip.

In the home environment, electronic receipt retrieval and processing for expiration date management is preferably performed by a purpose built electronic home terminal unit 24 which is located in proximity to a refrigerator, if the items being expiration date managed are grocery items, for example. Although located in proximity to a refrigerator 26 or even mounted on the refrigerator unit or in a door thereof, the home terminal 24 includes appropriate communication interface hardware and software to enable it to receive electronic receipt information, either from a consumer, by reading the information contained on the consumer's IC card, or by contacting a store's web server 20 and accessing the file or memory storage area 22 for the appropriate electronic receipt. Such appropriate communication interface hardware and software might include a modem configured for Internet communication through a telephone subscriber line interface, an ISDN interface, cable modem and cable connection, an IC card reader/writer unit, their appropriate controlling application software, and the like.

In addition, the home terminal 24 also includes some means of scanning, or otherwise identifying, items that have been recently purchased and are to be stored in the refrigerator unit 26 with which the home terminal 24 is associated. If item identification is made at the retail store with a bar code, the home terminal 24 will suitably include a bar code scanner 28 with which the bar codes of purchased items may be scanned and entered into the terminal's memory for further processing. As will be described in greater detail below, the identification means need not be a bar code scanner. Various retail facilities often identify their goods with an RFID tag either alone, or in combination with a bar code. If item information is obtained from reading an RFID tag by the store, the home terminal 24 will likewise be provided with an RFID receiver unit so that an accurate and timely inventory might be taken and maintained of items identified by RFID tags.

Figure 2:
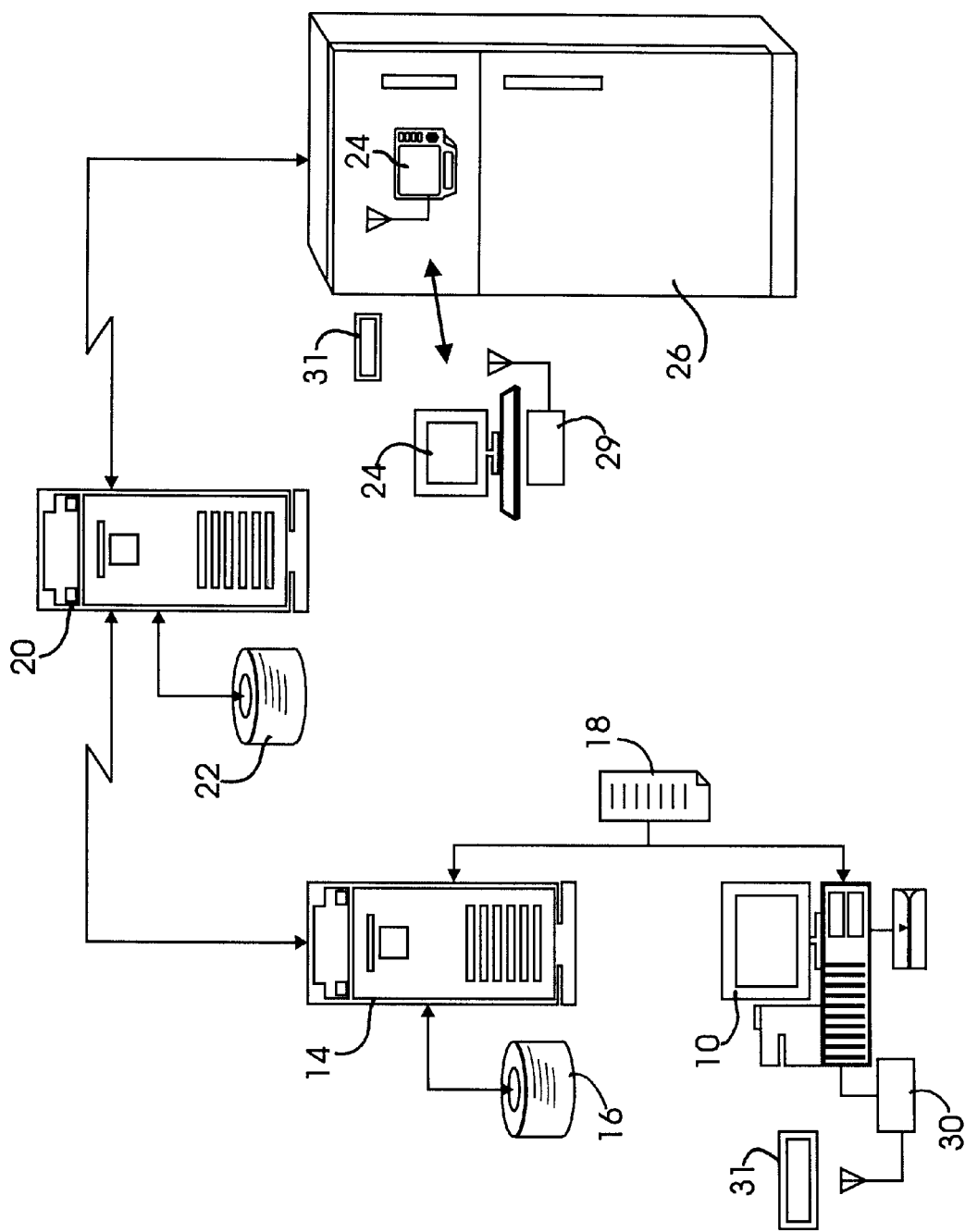
FIG. 2 is a simplified, semi-schematic diagram of an expiration date management system according to the present invention utilizing RFID labeling.

Such a system, in accordance with practice of the present invention, which utilizes RFID tags for merchandise identification, is illustrated in the simplified, semi-schematic system diagram of FIG. 2. Since the system, in accordance with the invention, depicted in FIG. 2 is generally similar to the system illustrated in FIG. 1, and contains a number of common elements, those common elements will be identified with the same numeral as the corresponding element of FIG. 1. Thus, items to be purchased will be taken to a POS terminal 10 comprising a checkout station. The POS terminal 10 need not be a conventional checkout station such as one operated by a store clerk, but might also be a self operated checkout terminal, a kiosk-type checkout terminal, a portable customer operated self-scanning terminal, and the like. No matter what form taken by the POS terminal 10, the terminal system necessarily includes an RFID reader unit 30 which is configured to interrogate RFID labels 31 disposed on individual items of merchandise and retrieve the item information contained in each RFID label. An RFID capable terminal is able to read all of the RFID labels of all purchased items in a shopping cart or shopping basket in a single operation, without the need for human intervention. RFID labels conventionally contain at least some form of identification code (a PLU code, UPC code or SKU code) specific to the particular item to which the RFID label is attached. The checkout station terminal 10 identifies all the purchased items by the corresponding item code (PLU, SKU or UPC), and accesses an item information database (PLU table, for example) 16 hosted by a store server 14, in order to obtain item information such as the item name, item price, associated discounts, and the like, for each purchased item.

In addition, the checkout terminal 10 is able to retrieve expiration date information and freshness period information for each tagged item, by accessing the appropriate item database files or PLU table fields of the information database 16 for each item. Once all of the requisite information is obtained for each item identified by an RFID tag, the checkout terminal 10 generates an electronic receipt 18, the form of which will be described in greater detail below.

As was the case with the exemplary embodiment of FIG. 1, the electronic receipt 18 is either provided directly to the customer, by writing the electronic receipt information into a memory storage area of an IC card or alternatively, the electronic receipt is transmitted to the store's web server 20 where it is stored in a local file or memory storage area 22 for eventual retrieval. It should be noted, that in both the exemplary embodiments of FIGS. 1 and 2, that the electronic receipt need not necessarily be generated by the POS checkout terminal 10, before transmission to the store's web server 20. Indeed, all of the requisite information acquired with regard to each individual item to be purchased might be processed by the facility's store server 14 in order to generate an electronic receipt. In addition, if the system were configured to make electronic receipts available to consumers only through a web server-type arrangement, it will be understood that the web server is equally capable of processing each item's associated information in order to generate an electronic receipt. Thus, the electronic receipt is able to be generated by any of the electronic data processing equipments contemplated by the system of the present invention.

Returning to FIG. 2, once generated, the electronic receipt 18 is made available to, and processed by, a home terminal unit 24 disposed in proximity to the place where perishable, expiration dated goods are to be stored, such as a home refrigerator 26. As was the case with the illustrated embodiment of FIG. 1, the home terminal 24 is configured to include communication interface hardware and software which will allow the home terminal to access an electronic receipt storage means and retrieve the electronic receipt 18. If the electronic receipt is provided directly to a customer by means of an IC card, the home terminal 24 will necessarily include an IC card reader/writer unit, configured to interface with a customer's IC card. The home terminal is additionally configured to include an RFID reader 29 to enable the terminal to read RFID tagged goods, as will be described further below. The RFID reader 29 is suitably disposed such that it is able to interrogate RFID labeled goods inside the refrigerator 26 and automatically identify whether items have been added or removed from the refrigerator contents. Likewise, the home terminal 24 is configured with communication interface hardware and software such as a telephone line modem, cable modem or any other communication interface which allows communication between the home terminal 24 and the web server 20 hosting the electronic receipt.

Pertinent to the configuration of the home terminal 24, is the realization that its function may be performed by a number of different systems. For example, the functions of the home terminal are easily performed by a conventional personal computer (PC) which might even be configured as a lap top. In addition, the home terminal might suitably be implemented as a reduced function PC, such as a web terminal (a purpose-built processor containing Internet access hardware and software and including a web browser). The home terminal function might also be accomplished by an Internet TV, a web TV or other, similar devices having communication interface circuitry, Internet access and some degree of processing power. The home terminal, when used for expiration date management of grocery items, could be configured so as to be easily mounted on the door of a refrigerator. The terminal includes at least a display and some means for inputting data, such as a touch sensitive screen, a keyboard, a keypad and/or speech recognition processing. Depending on the system configuration, the terminal optionally includes an RFID reader interface, bar code scanner interface and/or a Smart Card reader/writer interface. In the case where the system is configured to operate in conjunction with products that are identified by RFID tags, the RFID reader unit 29 is preferably installed inside the refrigerator in order to be in sufficient proximity to the items to identify RFID labeled items stored therein.

As was described above, in connection with the exemplary embodiments of FIGS. 1 and 2, expiration date information and freshness period information for any particular perishable item stocked by a store can be associated with that item in a number of ways. As a particular item is manufactured or packaged, that item's expiration date and/or freshness period information is associated to that item by the manufacturer. Typically, this is done by stamping or otherwise affixing an expiration date onto the product package and/or including a freshness period warning among label contents, i.e., use within three days after opening.

In one embodiment of the invention, as a store, such as a grocery store, receives merchandise from a wholesaler or distributer, the expiration date and freshness period information associated with each item of merchandise received in a shipment is entered into the store's merchandise inventory database system along with each item's UPC or SKU code information. When such information is entered into a store's database, it is often compiled in what is termed a PLU (Price Look Up or Product Look Up) table. PLU tables are typically organized by an individual item's UPC or SKU number and include fields associated with an item's code that identify the name of the item, the item price, and the like. A store's inventory management system might be implemented as an expanded form of PLU table with a number of items in inventory field appended to the typical item identification fields. As new items are received in inventory, each item's bar code or RFID label is scanned or read and the inventory field associated with that particular code is incremented. According to the invention, expiration date and freshness period information are also entered into the system's database as new items of merchandise are added to system inventory. Since bar code and RFID labels include lot number and time stamp information, it is a relatively simple matter to keep track of expiration date information with respect to different shipments of similar goods that arrive at different times. In one embodiment of the invention, expiration date and freshness period information is contained in an appropriate field or fields which are appended to the item information fields contained in a PLU table.

A further embodiment of the invention contemplates maintaining expiration date and freshness period information in an "expiration date database". Such a database is similar to a PLU table, but is constructed of a truncated set of information fields. As depicted in FIG. 3, an expiration date database is constructed of a set of entries, with each entry identifying a particular perishable item by its corresponding UPC code (or SKU number). An expiration date is associated to each UPC code, as is a freshness period after the package is open. If the expiration date database is constructed to include only perishable items, it is axiomatic that each item will have an associated expiration date. However, not all items will have a varying freshness period depending on whether or not the item has been removed from the package. For example, fresh fruits and vegetables will be understood to have an expiration date, i.e., a period after which they become rotten, but do not necessarily have a variable freshness period. In contrast, many items, such as canned fruits and vegetables, will have an expiration date extending far into the future, but have a relatively short freshness period, i.e., 7 to 10 days, after the can has been opened. The expiration date database makes all of this information available upon entry of the appropriate corresponding UPC code.

Thus, as a particular item is being purchased by a customer and that item's code is either scanned by a bar code scanner or accessed by an RFID reader, that item's expiration date and freshness period information is extracted from the database either from that item's PLU table entry or from information entered into an expiration date database.

As an alternative to database or PLU table entry, an item's expiration date and/or freshness period information may be embedded or appended to machine readable item identification means (bar code or RFID tag) affixed to an item's packaging. Expiration date information and/or freshness period information might be provided as part of an extended bar code or as a second bar code printed on the product packaging as the item is ready to ship. Likewise, expiration date information and freshness period information might be appended to the conventional information provided in an RFID tag. Thus, rather than defining a link to the expiration date and freshness period information contained in the database, an item's bar code and/or RFID tag contains all of the requisite information associated to that item.

As an item is scanned by a bar code scanner or interrogated by an RFID reader, the bar code or RFID information is electronically read and interpreted in order to retrieve that item's expiration date and freshness period information.

It should be understood that the particular illustrated embodiments of the invention depicted and described in connection with FIGS. 1, 2, and 3, are not intended to be limiting as to how expiration date and freshness period information is acquired or stored. It should be understood that an item information database may be implemented as a PLU table, a subset of a PLU table, as a relational database, and the like. Further, the database need not be hosted on a platform server, but it might be stored locally at each checkout station or POS terminal. The database need not even be locally available, but rather it might be accessible through an Internet connection from an enterprise-wide platform system or even constructed "on-the-fly" by accessing different web sites for each particular manufacturer as indicated by the item's bar code or RFID label.

Further, the expiration date and freshness period information need not necessarily be provided as an adjunct to conventionally understood bar codes or RFID labels. An additional method to make expiration date information available in a machine readable form is to print the expiration date and freshness period information on the product label in a machine-readable font, such as is used to identify codes on airplane tickets. The alpha numeric information is scanned by a receiving retailer when the product is entered into inventory and the information is interpreted by an application software program into recognizable expiration date an/or shelf life limitation information in an electronically storable form.

In accordance with the present invention, expiration date and freshness period information is provided to, or made accessible to, the purchaser along with other pertinent information about each item purchased, in the form of an electronic receipt. Once all of a customer's items have been bar code scanned or RFID interrogated, and the purchaser has paid for the items, an electronic receipt is generated, often in conjunction with an optional conventional paper receipt.

FIG. 4 depicts the layout organization of an exemplary electronic receipt, in simplified, semi-schematic form. As shown in FIG. 4, a typical electronic receipt will include certain demographic information such as the customer's name, a unique identification tag issued by the store in order to identify that customer (a customer ID), the name of the store issuing the receipt, and the time and date of the shopping excursion. Additionally, an electronic receipt includes the same types of information associated with conventional paper receipts, such as the name of each item or its description, the quantity of each item purchased and the price paid for the item. The electronic receipt also includes entries for the total price paid, sales tax information, and the like.

In accordance with the invention, the electronic receipt further includes certain information not normally contained in a conventional paper receipt. This information suitably comprises each item's UPC code, with each code entry associated with its corresponding item, an expiration date entry and a freshness period entry, each associated to its corresponding item through that item's UPC code. Thus, as indicated in FIG. 4, the customer purchased two portions of low fat cream cheese at a price of $5.96. Low fat cream cheese has a UPC code of 41334444 and an expiration date of Sep. 30, 1999. The low fat cream cheese item purchased by the customer has a residual freshness period of 10 days after the package has been opened, after which the item is no longer safe for consumption. Further, as is indicated in FIG. 4, items such as Fuji apples and low fat milk have an expiration date but no residual freshness period. Likewise, items such as tissues and shampoo have neither a residual freshness period nor an expiration date. All of the information contained in the exemplary electronic receipt of FIG. 4 is able to be retrieved electronically by whatever form of system is preparing the electronic receipt. Typically the item description and item price information are acquired from the store's PLU table, as is the UPC information. Expiration date and freshness period information is acquired either from the store's PLU table, an expiration date database, or from an extended bar code or an extended RFID label affixed to the product.

As was described above, the electronic receipt can either be recorded on a Smart Card or IC card and presented to the purchaser upon checkout or alternatively, the electronic receipt can be delivered through a communications network, such as the Internet, typically through a store server, to a particular web server. The web server stores the purchasers electronic receipt in a database of electronic receipts where it may be suitably accessed by either the consumer or by a home terminal, such as will be described further below. In an embodiment where the electronic receipt is saved in a database of receipts, it will be understood that appropriate password protection will be given to the electronic receipt information such that only the appropriate purchaser can access the information. For example, the customer might identify themselves with their customer ID, which is matched to the customer ID field comprising a receipt.

Figure 5:
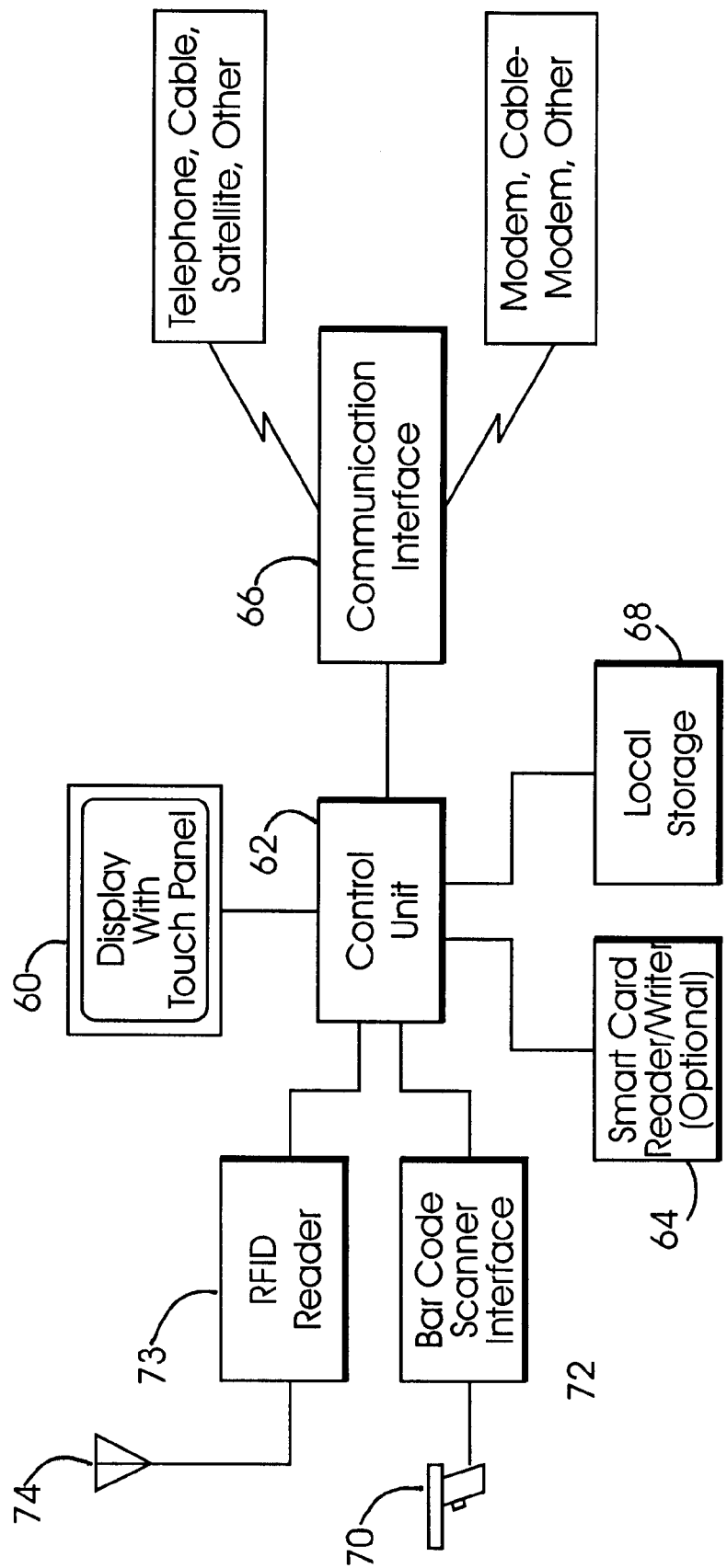
FIG. 5 is a simplified, semi-schematic block diagram of the system configuration of an exemplary home terminal.

In accordance with the present invention, the expiration date and/or freshness period information, included in the electronic receipt along with the item description and the item's UPC code, is communicated to a computer equipped with a microprocessor, or to a computer system network, accessible by the purchaser, and programmed to receive the information contained in an electronic receipt for each product item purchased by that purchaser. In a residential embodiment, the computer system might be implemented as a home PC, a web terminal, Internet TV, web TV a specialized purpose-built "kitchen terminal" or the like (all referred to herein with the common term "home terminal"). FIG. 5 is a simplified, semi-schematic block diagram of an exemplary system configuration of a home terminal, suitable for practice of the present invention. As seen in FIG. 5, one embodiment of a home terminal includes a display screen 60 which might be implemented as a "touch screen" or touch panel display. The display screen 60 is coupled to and controlled by a central control unit 62 which performs the primary processing functions of the home terminal and which includes a microprocessor, a signal processor, or some other such form of central processing unit.

The purchaser is able to transfer the contents of the electronic receipt to the home terminal in any one of a number of ways. The home terminal has the provision for being connected to an optional Smart Card reader/writer 64 with which to access the electronic receipt information recorded on a Smart Card or IC card by the store where the purchaser bought the product items. Alternatively, a communication interface 66, such as a modem, cable modem or other similar communication interface device, enables a home terminal to contact an off-site location, such as a store web site, where it is able to access and download an electronic receipt. It should be noted that in the case where the electronic receipt is stored on a web server, the web server is able to automatically generate an e-mail to the purchaser's home terminal in order to notify the purchaser that the electronic receipt is available for access or download. Pertinent to the communication interface 66 is that the interface is coupled to a global communications network, such as the Internet, via a communication link such as a telephone subscriber line, ISDN line, cable, satellite, or other similar form of communication link. However accessed, whether through the Smart Card reader 64 or the communication interface 66, the electronic receipt information received by the home terminal is stored in a local memory storage area 68 which might be implemented as Read Only Memory (ROM), Random Access Memory (RAM), a hard disk drive, or the like.

In order to account for changes in a purchaser's perishable goods inventory, the home terminal is suitably provided with various means to identify products as they are introduced to a refrigerator, for example, by the purchaser. In this regard, the home terminal includes a bar code scanner 70 coupled to a bar code scanner interface 72, in turn connected to and controlled by the home terminal's control unit 62. The bar code scanner 70 functions to identify the introduction of goods that are identified by bar codes that have been pre-printed on the product label, for example. In addition, in cases where certain merchandise items are identified and tagged by RFID labels, the home terminal is suitably provided with an RFID reader 72, coupled to and controlled by the control unit 62 which is able to interrogate and identify a product's RFID label through an integral antenna 74.

Thus, it should be understood that the home terminal has generally the same capabilities of recognizing a product, particularly with respect to the product's UPC code, as the store from which that product was purchased. In the case of the store, the product indicia (the bar code or RFID label) was translated to a UPC number (in its simplest form) which was then used to access a store database in order to acquire additional information about that product. In the case of the home terminal, generally the same apparatus (bar code scanner or RFID reader) is used to acquire the same product indicia which, in a manner to be described in greater detail below, is used to identify recently purchased perishable goods and to invoke the terminal's expiration date management system.

In operation, the home terminal (24 of FIGS. 1 and 2) is used to specify items that have been purchased and that will be stored in a refrigerator, for example, by the purchaser (i.e., used to inventory items). Specifying newly purchased items depends on whether the items are identified by a bar code label or by an RFID label. In the first case, items are specified to the home terminal by depressing an "IN" key or button, indicating that the terminal is to download an electronic receipt and add the newly purchased items into terminal memory. In the case of items identified by an RFID label, the home terminal's RFID reader 72 identifies the addition of newly purchased items by periodically interrogating the contents of the refrigerator and, if new items are discovered, the terminal downloads the appropriate electronic receipt. After items have been identified to the terminal as newly purchased, the control unit, under appropriate software program control, obtains the corresponding electronic receipt from the store's web server either by Internet mail or direct web site access. In this particular circumstance, the customer name, customer ID, store name and shopping date and time are used as key associative information for electronic receipt retrieval. If the electronic receipt is provided to the purchaser by means of a Smart Card or IC card, the home terminal control unit would display a "insert Smart Card" message to the consumer and subsequently read the contents of the Smart Cart or IC card in order to obtain the electronic receipt information.

Once the electronic receipt is obtained, by either access means, the items listed in the electronic receipt are added or appended to an internally maintained file comprising a list of stock items (i.e., an inventory list). Depending on the particular configuration desired, either all of the items included in the electronic receipt are added to the list of stock items or, alternatively, only items which have expiration date information are captured and are added to a list of expiration date stock items.

FIG. 6 is a simplified, semi-schematic illustration of an exemplary "expiration date list" such as might be obtained and constructed from the electronic receipt information depicted in FIG. 4. The exemplary expiration date list of FIG. 6 is constructed to include an item description field for each item captured from the electronic receipt, an item quantity field, a purchase date field and particular fields denoting expiration date and freshness period information captured from an electronic receipt.

Figure 7:
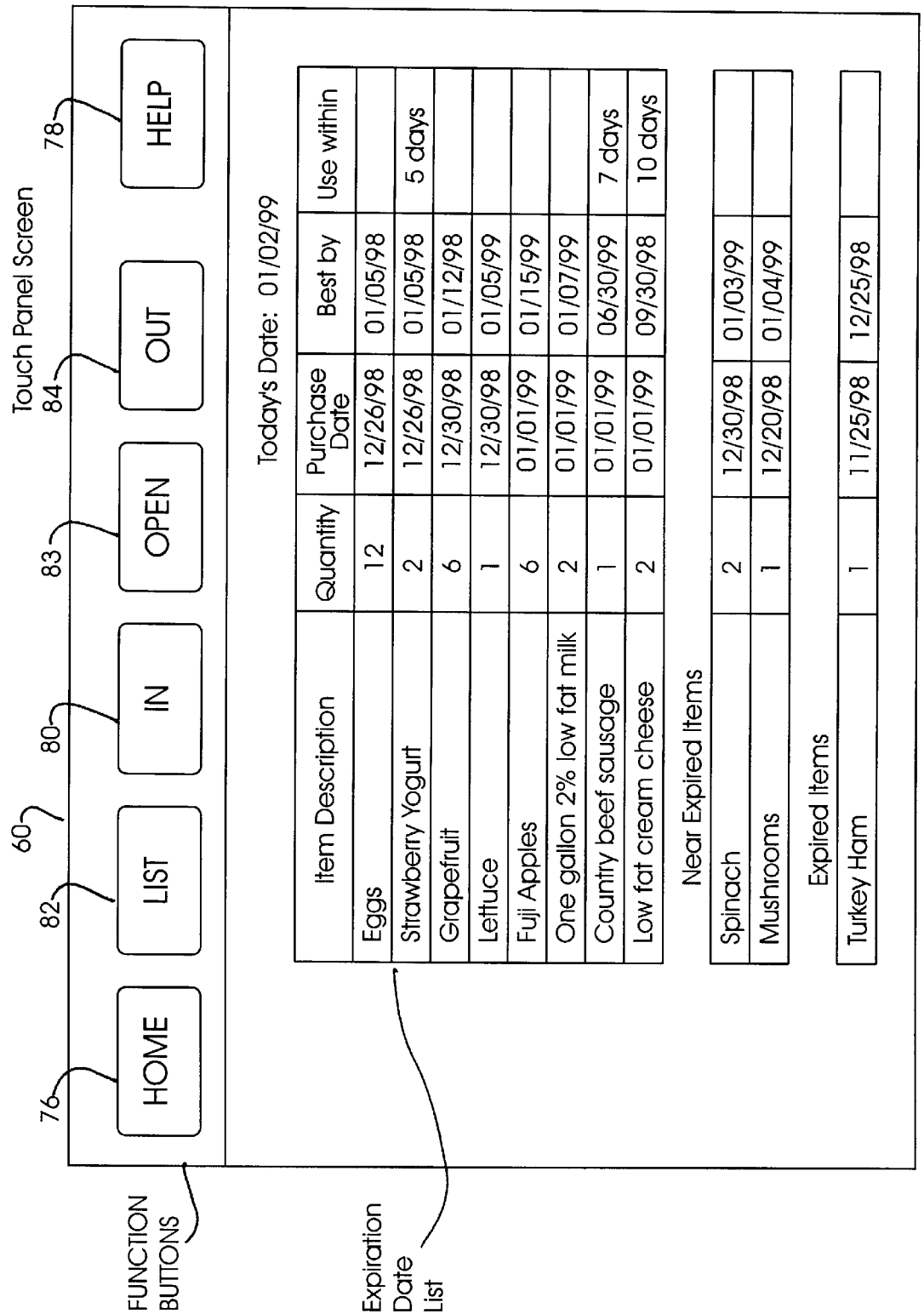
FIG. 7 is a simplified, semi-schematic diagram of a touch panel screen display of a home terminal, detailing the organization of a purchaser's exemplary expiration date listing.

Turning now to FIG. 7, which is an exemplary home terminal screen display of the expiration date list of FIG. 6, the operation of the home terminal will now be described in connection with a particular set of control functions, illustrated as function buttons in the exemplary embodiment of FIG. 7, when the display screen is implemented as a touch screen panel. Briefly, the touch panel is used to specify the various control functions as well as providing an alpha numeric character input for manual item data input. When configuring the screen as an alpha numeric input, a special function button such as "home" 76 or "help" 78 might be selected to invoke a function menu from which a keypad configuration might be selected for manual data input. However, the operation of the home terminal in accord with the present invention will be described in connection with automatic item data entry for ease of explanation.

In order for the terminal to develop and maintain a stock record of items stored in a refrigerator, it is necessary to indicate to the terminal that newly purchased items have been added to the current stock. Since items identified by bar code labels cannot be automatically identified to the terminal, these items are identified to the home terminal unit as added items, by the user, by depressing the "IN" key 80 on the touch screen panel of the home terminal display screen 60. When the "IN" key 80 is depressed, an application software program resident in the home terminal understands that additional items are to be added to the list maintained in memory and issues the appropriate commands to launch a web access routine and request the latest electronic receipt information from a web server, for example, using the customer's name, customer ID, store name and shopping date and time, as key index fields for receipt retrieval.

Alternatively, if an electronic receipt is provided by a smart card, the control unit (62 of FIG. 5) causes the screen to display the message "insert smart card". Once the smart card is inserted into the smart card reader (64 of FIG. 5) the terminal reads the contents of the card to obtain the electronic receipt information.

Once the electronic receipt information is received (either from the web server or from a purchaser's IC card) the home terminal system may either append all newly purchased items to the current stock list or, alternatively may only append those items which contain expiration date information to the current list. Where the terminal is configured to append all newly purchased items to its current stock, the user is able to manually edit the list by selecting certain items which do not have expiration dates, i.e., tissues, and depressing the OUT key or button 84 on the terminal's touch panel screen. Thus, the home terminal system is able to create and maintain a current stock list (expiration date list) comprising an item name or description, a quantity field, a purchase date field, and fields related to each item's expiration date and/or corresponding freshness period.

Items labeled with RFID tags are able to be automatically sensed by the terminal and newly purchased items can be automatically identified. The terminal periodically interrogates the refrigerator contents, by asserting an RF interrogation signal, to determine if any newly purchased items have been added. Each item in the refrigerator provided with an RFID label responds with its label contents, i.e., its UPC code. The control unit compares the current inventory with the previous inventory and, if any newly purchased items are present, invokes an application program. As described previously, the program retrieves an electronic receipt, either from a store web page or by requesting the customer to insert a smart card containing electronic receipt information. Once the electronic receipt is obtained, expiration date information and other related indicia is matched to the newly added items by the UPC code.

Since it is sometimes the case that a certain number of purchased items are not labeled, either with a bar code or with an RFID label, it becomes necessary to manually inform the home terminal unit that certain items are being added into perishable item inventory. This is also the case where a particular store does not have the capability of creating an electronic receipt.

In either case, items may be manually identified to the home terminal unit by depressing the IN key or button 80 on the touch panel screen. When IN is depressed, and no electronic receipt is available, the corresponding I/O devices such as the bar code scanner (70 of FIG. 5) or RFID reader (72 of FIG. 5) are activated for manual entry. Manual data entry can be done by scanning an item's bar code, reading the contents of an RFID label or by reconfiguring the screen for alpha-numeric keyboard entry. Thus, the present invention is able to accommodate manual data entry when necessary, even though it is primarily configured to minimize human intervention.

Once the list is created, a purchaser is able to review the contents of the list by depressing a "LIST" key 82. As shown in the exemplary screen display of FIG. 7, the inventory list includes not only a list of expiration dated products, but also a sub-list of "near expired items" as well as an additional sub-list of "already expired items". The "near expired items" list is a purpose defined subset of the complete expiration date list but includes those selected items whose expiration date is calculated as being within a pre-defined time period of the current date and time (i.e., today). As depicted in FIG. 7, two packages of spinach have an expiration date of Jan. 3, 1999, which is only one day away from the current date of Jan. 2, 1999. Likewise, a package of mushrooms has an expiration date of Jan. 4, 1999, only two days away from the current date.

The "already expired items" list includes those items whose expiration date has already passed. Likewise, the "already expired items" list might also include those items whose expiration date has not yet been exceeded, but which have been opened for a period longer than their stated freshness period.

In this regard, the user is able to identify when a particular perishable item's package has been opened by depressing the OPEN key 83 of the touch screen panel of the home terminal. Once the OPEN key has been depressed, the user selects which of the items have indeed been opened by scrolling through the perishable item list and selecting the specific item whose container has just been opened. The user might, for example, select the OPEN key 83 and then choose low fat cream cheese as the item which has been opened. Since there are two quantities of low fat cream cheese indicated in the list, only one will be selected unless the user chooses to select the second. For the item selected as being open, the system begins a countdown clock which decrements the freshness period entry by 1 for each passing calendar day. Thus, the low fat cream cheese entries for Jan. 4, 1999 would include 1 entry having a freshness period of 10 days and a second entry having a freshness period of 8 days.

Once an item has been exhausted, or the user desires to remove an item from storage either for consumption or because it has exceeded its expiration date period, the user selects the OUT key 84 which indicates to the home terminal system that an item or items will be deleted from the list. After the OUT key 84 has been selected, the user again scrolls through the list of items in order to select the item or items which will be deleted. If, for example, the user consumes all of one quantity of low fat cream cheese, the perishable item inventory list will only have an entry for 1 quantity of low fat cream cheese remaining.

It should be understood that in the case of goods identified by an RFID label, the user need not concern themselves with use of the IN 80 or OUT 84 keys in order to indicate to the home terminal that items have been added or deleted from inventory. Where the system contemplates the use of RFID labels, the system is configured to automatically and periodically interrogate the contents of the refrigerator and compare the return values with the perishable item inventory list. In this manner, both newly added items and newly deleted items will be immediately identified by comparing the results of the present interrogation with the next prior one's results. It should also be noted that if the item is identified by a bar code, the user is able to identify that item's deletion by depressing the OUT key 84 and then by scanning the item's bar code. This informs the system that that item has been deleted and its entry is consequently removed from the perishable item inventory list.

Notwithstanding the foregoing, it should be understood that the operation of the home terminal unit has been described in connection with the above-exemplary embodiment for the case where an item bar code or an item RFID label contains only the item identification code (i.e., a UPC code or an SKU code). In the case where additional information is included as an extended bar code or an additional bar code pre-printed on a package label or additional information is included in the contents of an RFID label, there may be no need for the home terminal unit to consult an electronic receipt in order to generate a perishable item inventory list with all of the necessary data fields included therein. Depending on the type and amount of information included in either a bar code or an RFID label, it will be understood by those having skill in the art that the home terminal unit may need to consult an electronic receipt for a reduced subset of information contained thereon. For example, if the bar code or RFID label contains an expanded set of product identification information, the home terminal unit may only need to consult an electronic receipt in order to obtain expiration date and/or freshness period information. The home terminal will thus be understood to be a rather flexible device with regard to how information is obtained in order to construct the perishable item inventory list. Data input can be anywhere from completely manual to completely automatic (not requiring any human intervention) depending on the type and manner of item coding (i.e., bar code or RFID label) and the type and manner of system interrogation and data processing.

Thus, according to the invention, the system has present utility when an electronic receipt is used in conjunction with a conventional product code such as a bar code or an RFID label. The product code functions as a key which points to product name, description, price and expiration date information in the retail store environment. Likewise, the product code is used as a key in defining which items are to be added to perishable item inventory in the home environment. In the home, a home terminal uses the key to select items from an electronic receipt for addition to a perishable item inventory list. The perishable item inventory list includes the same type of product name, description, expiration date and/or freshness period information which was matched to a corresponding item in the retail store through the product code key. Use of an electronic receipt does not require changing current bar code application procedures nor does it require printing of additional information on product packaging when perishable contents are introduced to a package or container.

In future use, particularly in the case of an RFID label with expanded capabilities, all information may be easily incorporated into an RFID label and such information may be automatically captured by a home terminal unit upon that product's introduction into perishable item inventory storage. Thus, both electronic receipts and human intervention are no longer required for the addition or deletion of perishable items from a perishable item inventory list. While the invention has been described in connection with particular illustrated embodiments, those skilled in the art and technology to which the invention pertains will have no difficulty devising variations which in no way depart from the scope and spirit of the present invention. For example, while the illustrated embodiments have been described in connection with consumer shopping and home usage, it will be appreciated that the present invention may be adapted for utilization in restaurants, pharmacies, hospitals, and the like. Further, it will be understood that although the term "purchaser" has been used throughout the above-specified description, the term "purchaser" includes the individual that actually purchases the product items and anyone else able to operate the system in the case of home use of the invention. Accordingly, the present invention is not limited to the specific embodiments described above, but rather is defined by the scope and spirit of the appended claims.

What is claimed is:

1. A method for managing product items with shelf-life limitations comprising the steps of:

associating shelf-life limitation information to each of one or more perishable product items;

recording said shelf-life limitation information for each of said one or more perishable product items in a database;

identifying selected ones of perishable product items being purchased;

recovering said recorded shelf-life limitation information from the database for each of the perishable product items selected for purchase;

electronically recording said shelf-life limitation information for each of said one or more product items in an electronically readable and storable form;

providing the shelf-life limitation information to a purchasing customer in the electronically readable and storable form; and using a terminal accessed by the purchasing customer to add the shelf-life limitation information to an inventory list, the inventory list being used by the purchasing customer to manage use of the said one or more product items.

2. The method according to claim 1, further comprising the step of transferring said electronically recorded shelf-life limitation information to a memory storage area.

3. The method according to claim 2, wherein the shelf-life limitation information is recorded on an electronic receipt, the electronic receipt being transferred to a memory storage area of a web server.

4. The method according to claim 2, wherein the shelf-life limitation information is recorded on an electronic receipt, the electronic receipt being transferred to a memory storage area of a smart card.

5. The method according to claim 2, further comprising the steps of:

retrieving the shelf-life limitation information from the memory storage area; and displaying the electronic shelf-life limitation information for each of said one or more product items on a home terminal display screen.

6. The method according to claim 5, wherein the recorded shelf-life limitation information is electronically recovered from the database by a store check-out terminal.

7. The method according to claim 6, wherein the store check-out terminal electronically recovers the recorded shelf-life limitation information for each perishable product item by scanning a bar code each item and associating each item's bar code with an entry in the database.

8. The method according to claim 6, wherein the store check-out terminal electronically recovers the recorded shelf-life limitation information for each perishable product item by reading an RFID label affixed to each item and associating each item's RFID label information with an entry in the database.

9. The method according to claim 6, wherein the database comprises a price-look-up table, shelf-life limitation information for each perishable product item being associated to that item according to its corresponding entry in the price-look-up table.

10. The method of claim 1, wherein the shelf-life limitation information includes a period for which the product remains viable once it has been opened.

* * * * *